United States Patent
Lai et al.

(10) Patent No.: US 9,405,059 B2
(45) Date of Patent: Aug. 2, 2016

(54) ASSEMBLING APPARATUS FOR A LIGHT TUNNEL

(75) Inventors: Tu-Fa Lai, Taoyuan Hsien (TW); Zhon-Gren Zhu, Jiang Su (CN); Bu-Yu Zheng, Jiang Su (CN)

(73) Assignee: PREOPTIX (JIANGSU) CO. LTD. (TW)

( * ) Notice: Subject to any disclaimer, the term of this patent is extended or adjusted under 35 U.S.C. 154(b) by 991 days.

(21) Appl. No.: 13/333,002

(22) Filed: Dec. 21, 2011

(65) Prior Publication Data

US 2012/0210555 A1   Aug. 23, 2012

(30) Foreign Application Priority Data

Feb. 23, 2011   (CN) .................. 2011 2 0063843 U

(51) Int. Cl.
| | | |
|---|---|---|
| B29C 65/00 | (2006.01) | |
| F21V 8/00 | (2006.01) | |
| G02B 27/09 | (2006.01) | |
| B25B 1/20 | (2006.01) | |
| B25B 1/24 | (2006.01) | |
| B25B 11/02 | (2006.01) | |
| G03B 21/20 | (2006.01) | |

(52) U.S. Cl.
CPC .......... *G02B 6/0096* (2013.01); *G02B 27/0994* (2013.01); *B25B 1/20* (2013.01); *B25B 1/2463* (2013.01); *B25B 11/02* (2013.01); *G03B 21/208* (2013.01); *Y10T 29/49826* (2015.01); *Y10T 29/53* (2015.01); *Y10T 156/1751* (2015.01)

(58) Field of Classification Search
CPC ........... B29C 66/81433; G02B 6/0096; G02B 27/0994; B25B 1/12; B25B 1/20; B25B 1/103; B25B 1/125; B25B 1/2463; B25B 11/02; B23P 19/04; B23P 19/06; Y10T 156/1702; Y10T 156/1744; Y10T 156/1751
USPC ......... 156/305, 539, 556, 559, 581; 29/281.1, 29/281.5, 464; 385/133; 269/160, 253, 269/254 CS
See application file for complete search history.

(56) References Cited

U.S. PATENT DOCUMENTS

| | | | | |
|---|---|---|---|---|
| 2,800,804 | A * | 7/1957 | Olschwang | 74/89.35 |
| 2,882,771 | A * | 4/1959 | Blazek | 269/251 |
| 5,043,144 | A * | 8/1991 | Gordon et al. | 422/561 |
| 6,161,825 | A * | 12/2000 | Webster et al. | 269/246 |
| 2006/0227424 | A1 | 10/2006 | Wang et al. | |
| 2008/0118215 | A1 | 5/2008 | Chen et al. | |
| 2009/0052042 | A1 | 2/2009 | Liao | |

FOREIGN PATENT DOCUMENTS

TW      M343833 U     11/2008

* cited by examiner

*Primary Examiner* — John Goff
(74) *Attorney, Agent, or Firm* — Cantor Colburn LLP

(57) ABSTRACT

A fabricating apparatus for a light tunnel is provided, which comprises a core rod, a fixing block and a moving block. The light tunnel comprises a plurality of reflecting sheets, and each reflecting sheet leans on both a plurality of first bumps of the fixing block and a plurality of second bumps of the moving block to define a first inner profile and a second inner profile of the light tunnel, respectively. Thereby, the fabricating apparatus defines the inner scope of the light tunnel, and the inner scope of the light tunnel can be easily and stably controlled. Furthermore, a fabricating method for fabricating the light tunnel is also provided.

10 Claims, 9 Drawing Sheets

ASSEMBLING APPARATUS FOR A LIGHT TUNNEL

This application claims priority to Chinese Utility Model Application No. 201120063843.8 filed on Feb. 23, 2011.

CROSS-REFERENCES TO RELATED APPLICATIONS

Not applicable.

BACKGROUND OF THE INVENTION

1. Field of the Invention

The present invention relates to a fabricating apparatus for a light tunnel and a fabricating method for fabricating a light tunnel, and more particularly, to a fabricating apparatus and a fabricating method that use inner dimensions of a light tunnel as a reference for fabricating the light tunnel.

2. Descriptions of the Related Art

With continuous advancement of projection technologies, the applications of projectors have become wider and consumers now have more options in purchasing projectors. Accordingly, the imaging quality requirements of the projectors have become increasingly heightened. A projector comprises a lot of optical components, and the characteristics of the individual optical components have different effects on the imaging quality of the projector. Projection luminance is known to be an important indicator of imaging quality, so most projection optics researches spend their research and development resources on improving projection luminance. A usual practice for improving the projection luminance adopted in this industry is to enhance the reliability of components of the projector's illumination system, to reduce the overall volume of the illumination system and to improve efficiency of the light source.

The illumination system usually comprises a light source module, a lens, a light tunnel and the like. Generally, the light tunnel is used to uniformize the projection light, so it is able to control the projection luminance. Therefore, usually in practice, various parameters and the quality of the light tunnel are adjusted to improve the efficiency of the light source to improve the luminance of the images obtained.

In more detail, the light tunnel is able to uniformize the light transmitted therethrough and project the light onto an active region of a spatial light modulation device to effectively avoid non-uniformity of luminance in a specific light path of the optical projection system. However, the control of the projector luminance is significantly affected by inner profile dimensions of the light tunnel.

Most conventional fabricating processes of light tunnels fabricate a light tunnel through external positioning. FIG. 1A shows a schematic view of a fabricating apparatus 1 that uses outer dimensions of a light tunnel to position the light tunnel. During the fabrication process, a reflecting sheet stopping device 11 of the fabrication apparatus 1 is first adjusted to an appropriate position. Next, in reference to FIG. 1B, reflecting sheets 12 for forming the light tunnel are placed in sequence, and an inhaling switch (not shown) is opened to adsorb the reflecting sheets 12 onto ports of corresponding inhaling pipes 13 as shown in FIG. 1C. In reference to FIG. 1D, a pressing block 15 is placed on the top of the light tunnel 14 and an external pressure that is exerted by an elastic pressing head 16 is adjusted, then the elastic pressuring head 16 is lowered to fix the reflecting sheets 12 of the light tunnel 14 together, and finally the reflecting sheets 12 are glued into form.

For the fabricating process described above, a corresponding fabricating apparatus is first designed according to the outer dimensions of the light tunnel, and then the light tunnel is assembled by adjusting the fabricating apparatus, so that the inner profile dimensions of the light tunnel are guaranteed indirectly by use of the outer dimensions. However, this practice of fabricating a light tunnel through external positioning has several problems. Especially, because the inner profile dimensions of the light tunnel are determined through external positioning in the aforesaid practice, there are too many factors that have an effect on the inner profile dimensions, e.g., thicknesses of the reflecting sheets, inhaling forces of the inhaling pipes when the reflecting sheets are positioned, the operation mode and the flow process of adjusting the fabricating apparatus. Furthermore, this fabricating process is complex and makes it difficult to control the inner dimensions, which renders the product quality unstable in mass production.

Accordingly, an urgent need exists in the art to provide a fabricating apparatus for a light tunnel which can improve the imaging luminance by effectively controlling the inner dimensions of the light tunnel.

SUMMARY OF THE INVENTION

The primary objective of the present invention is to provide a fabricating apparatus for a light tunnel and a fabricating method for fabricating a light tunnel. The fabricating apparatus and the fabricating method of the present invention can effectively define inner dimensions of the light tunnel by defining an inner profile of the light tunnel to stabilize the quality of the light tunnels in mass production.

To achieve the aforesaid objective, the present invention provides a fabricating apparatus for a light tunnel. The light tunnel has a first end portion and a second end portion that have a first inner profile and a second inner profile respectively; the first end portion and the second end portion define an axial length. The fabricating apparatus comprises a core rod, a fixing block and a moving block. The core rod has an inner axial portion and an adjustment portion. The inner axial portion has a first length, and the adjustment portion is adapted to make the first length equal to the axial length of the light tunnel. The fixing block is disposed at one end of the inner axial portion, and has a first surface and a plurality of first bumps disposed on the first surface. The plurality of first bumps defines the first inner profile. The moving block is disposed between the inner axial portion and the adjustment portion, and has a second surface and a plurality of second bumps disposed on the second surface. The plurality of second bumps defines the second inner profile, and the second surface is opposite to the first surface.

To achieve the aforesaid objective, the present invention further provides a fabricating method for fabricating a light tunnel. The fabricating method adopts the fabricating apparatus described above. In detail, the fabricating method comprises: adjusting the adjustment portion of the fabricating apparatus to make the first length of the core rod equal to the axial length of the light tunnel; leaning a plurality of reflecting sheets on the first bumps and the second bumps; and fixing and connecting the reflecting sheets.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. However, these embodiments are not intended to limit the present invention to any specific environment, applications or particular implementations described in these embodiments. Therefore, the descriptions of these embodiments are only for purpose of illustration rather than to limit the present invention. It should be appreciated that in the following embodiments and the attached drawings, elements unrelated to the present invention are omitted from depiction; and dimensional relationships among individual elements in the attached drawings are illustrated only for ease of understanding, but not to limit the actual scale.

Figure 1A:
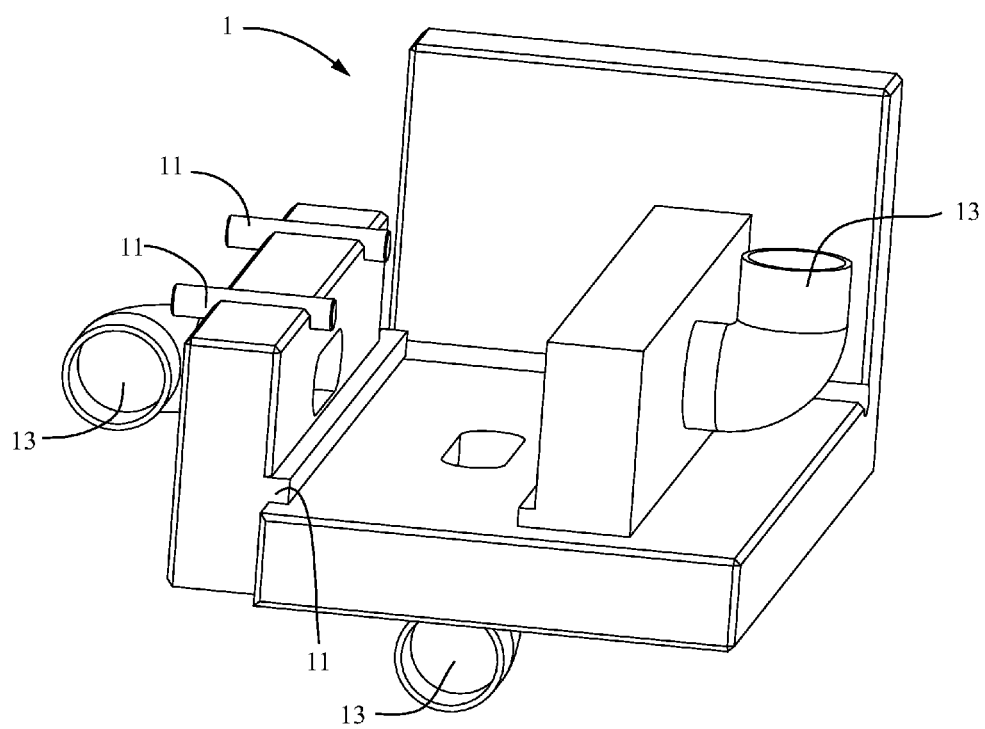
FIGS. 1A to 1D are schematic views illustrating a conventional process of fabricating a light tunnel through external positioning.
Figure 1B:
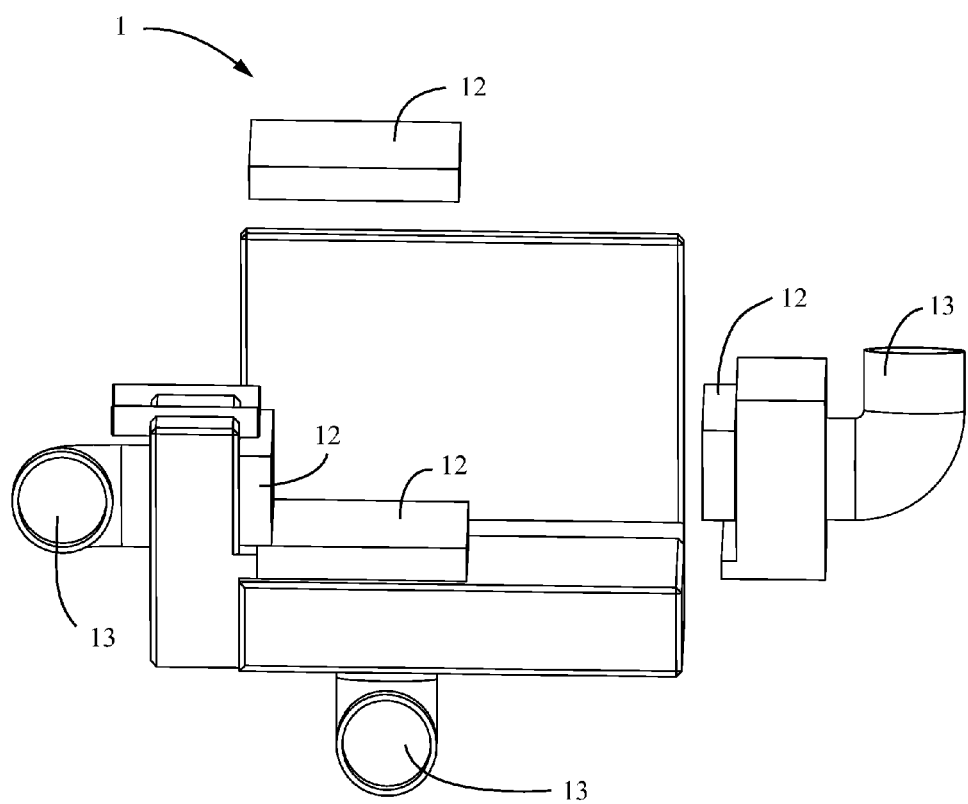
Figure 1C:
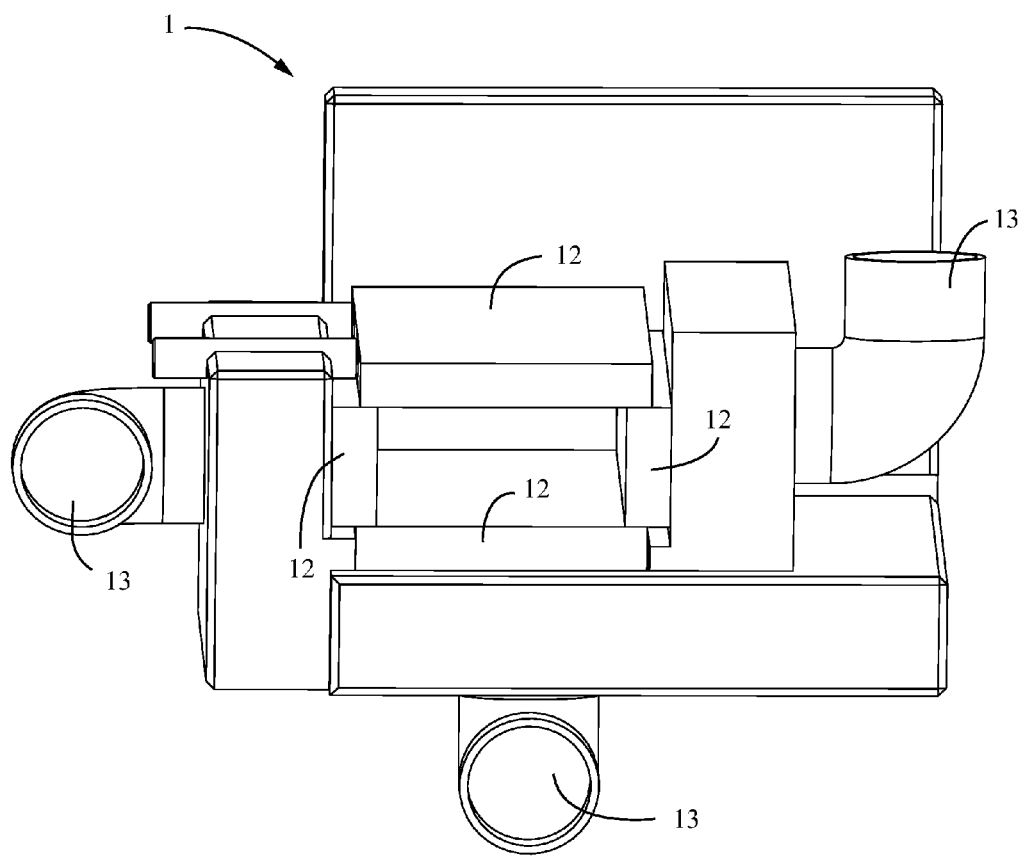
Figure 1D:
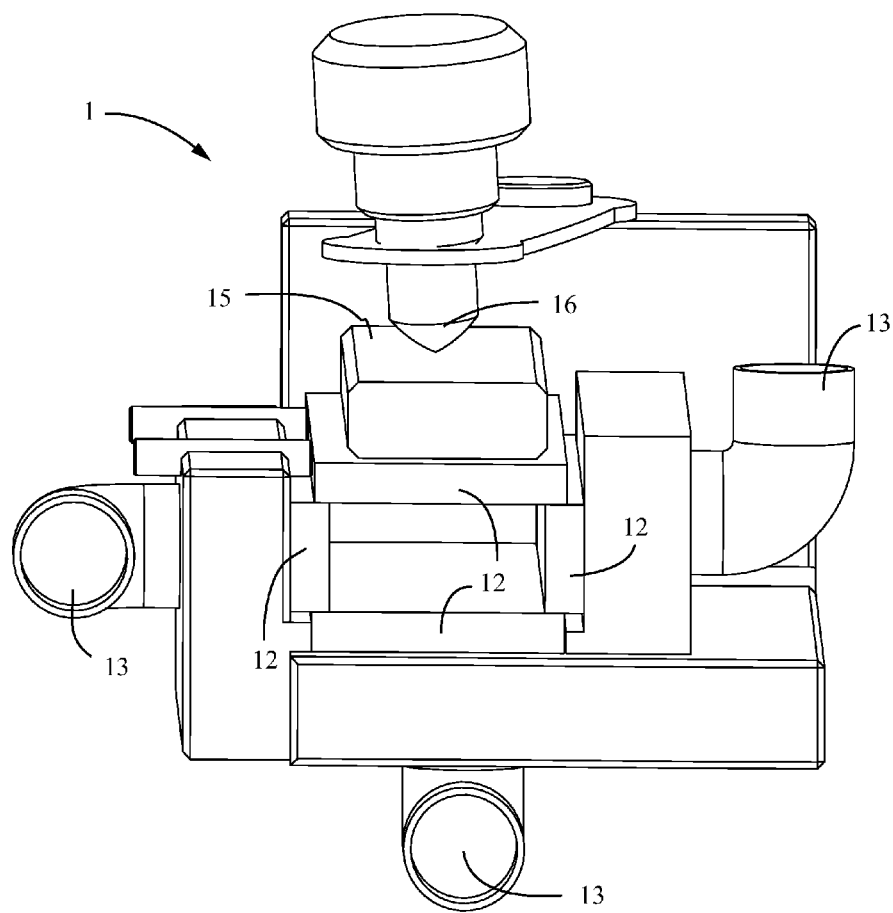
Figure 2A:
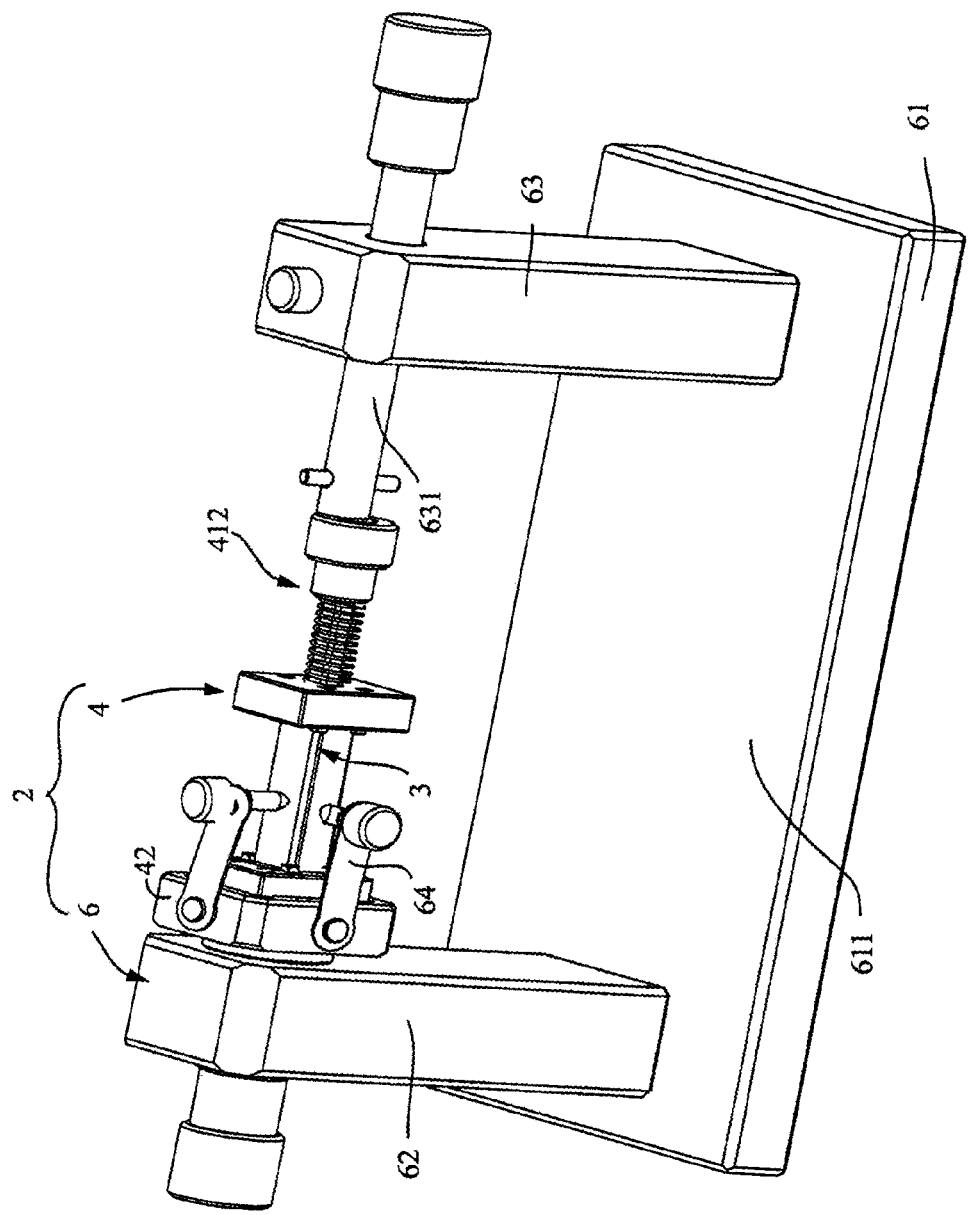
FIG. 2A is a schematic view of an assembling apparatus according to a preferred embodiment of the present invention.
Figure 2B:
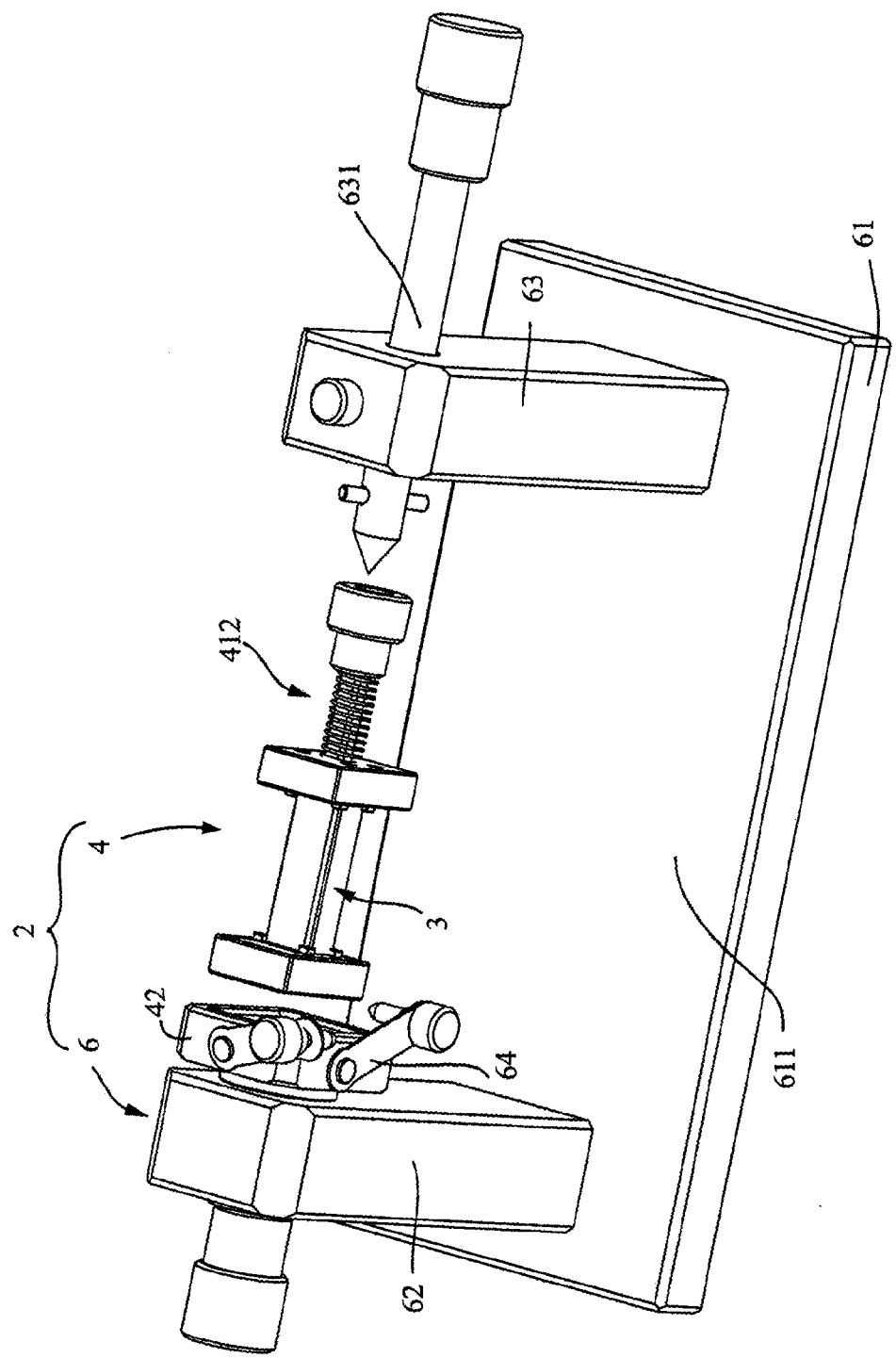
FIG. 2B is a schematic exploded view of the assembling apparatus shown in FIG. 2A.
Figure 3:
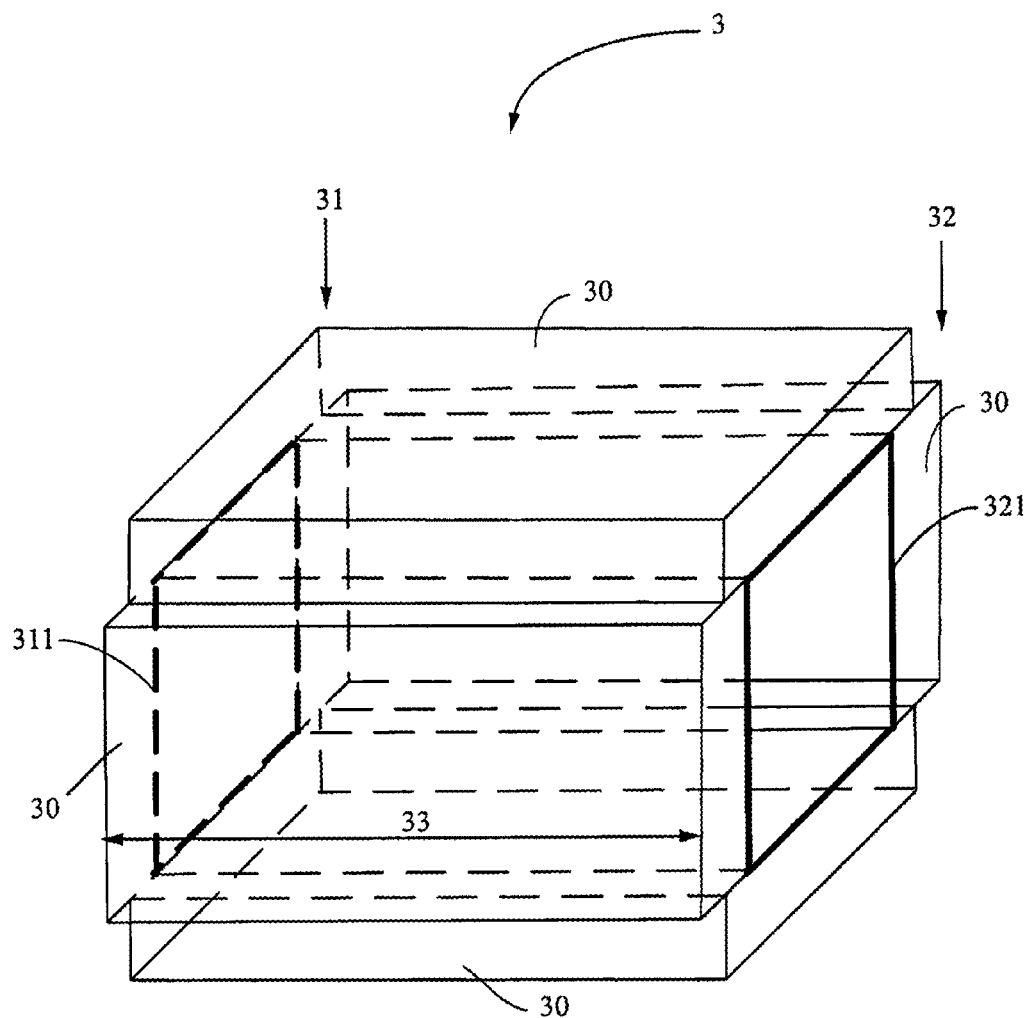
FIG. 3 is a schematic structural view of a light tunnel fabricated by use of the assembling apparatus shown in FIG. 2A.
Figure 4A:
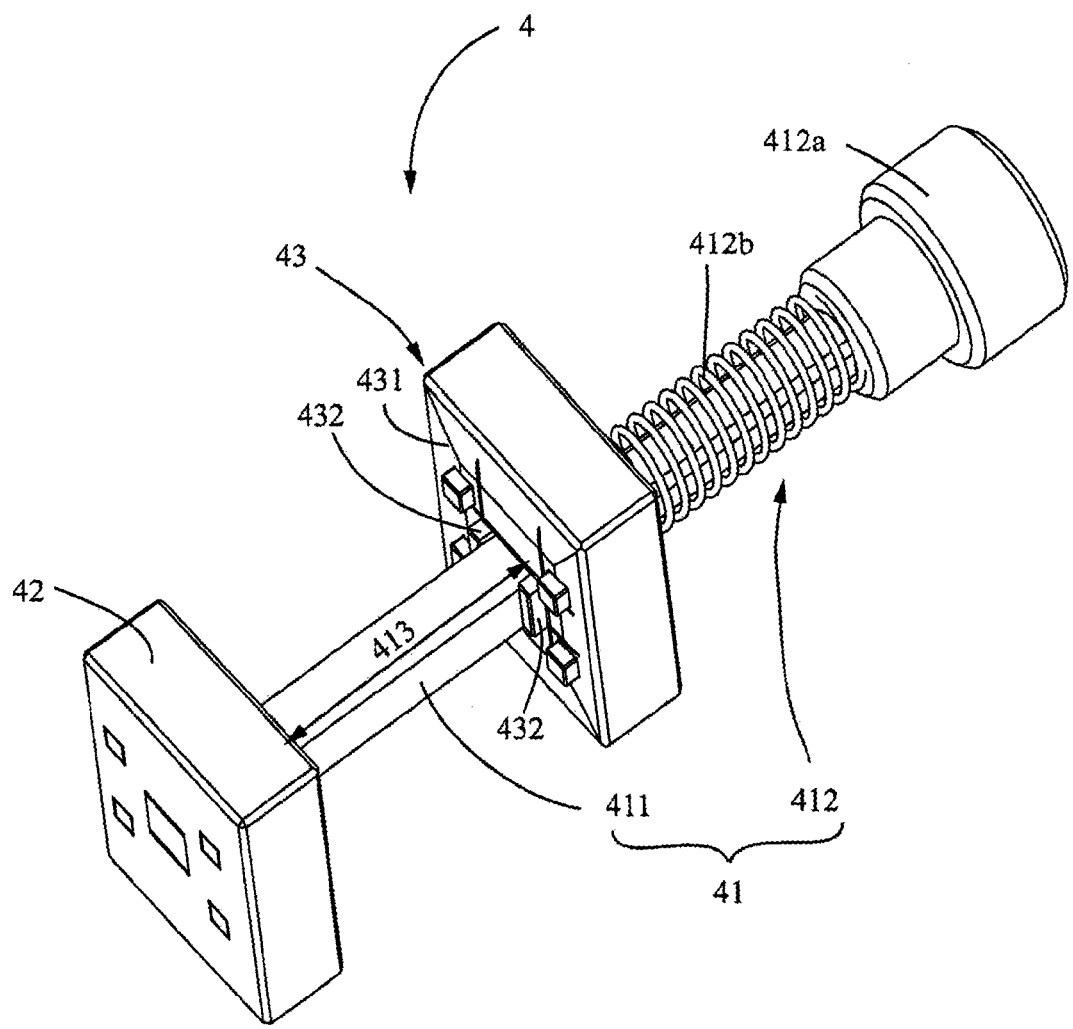
FIG. 4A is a schematic view of a whole fabricating apparatus shown in FIG. 2A.

A first preferred embodiment of the present invention is an assembling apparatus 2 for a light tunnel. FIGS. 2A and 2B illustrate a schematic assembled view and a schematic exploded view of the assembling apparatus 2 respectively, and FIG. 3 shows a light tunnel fabricated by the assembling apparatus 2. FIG. 4A is a schematic view of a whole fabricating apparatus 4 of this embodiment, and FIG. 4B is a schematic view, from another viewing angle, of the whole fabricating apparatus of this embodiment with an assembled light tunnel 3 being loaded thereon.

In brief, the assembling apparatus 2 comprises a fabricating apparatus 4 and a support platform 6. The light tunnel 3 has a first end portion 31 and a second end portion 32 located at two ends of the light tunnel 3 respectively. The first end portion 31 and the second end portion 32 has a first inner profile 311 and a second inner profile 321 respectively; and in this embodiment, both the first inner profile 311 and the second inner profile 321 are of a rectangular form and have equal dimensions. The first end portion 31 and the second end portion 32 located at the two ends of the light tunnel 3 define an axial length 33 of the light tunnel 3. Generally, the light tunnel consists of a plurality of reflecting sheets, and in this embodiment, consists of four reflecting sheets 30. Each of the reflecting sheets 30 is made of glass and plated with a highly reflective film on an inner surface thereof. Because the first inner profile 311 of the light tunnel 3 is the same as the second inner profile 321, the four reflecting sheets 30 are rectangular reflecting sheets that are disposed in parallel in groups of two to form the light tunnel 3 with a hollow rectangular passage. As will be appreciated by those skilled in the art, the material, the number and the positions of the reflecting sheets may be altered depending on the practical design; and in other embodiments, the first inner profile may also be smaller than the second inner profile, i.e., the first inner profile and the second inner profile are both of a rectangular form but the first inner profile is smaller in area than the second inner profile to result in a tapered light tunnel.

Figure 4B:
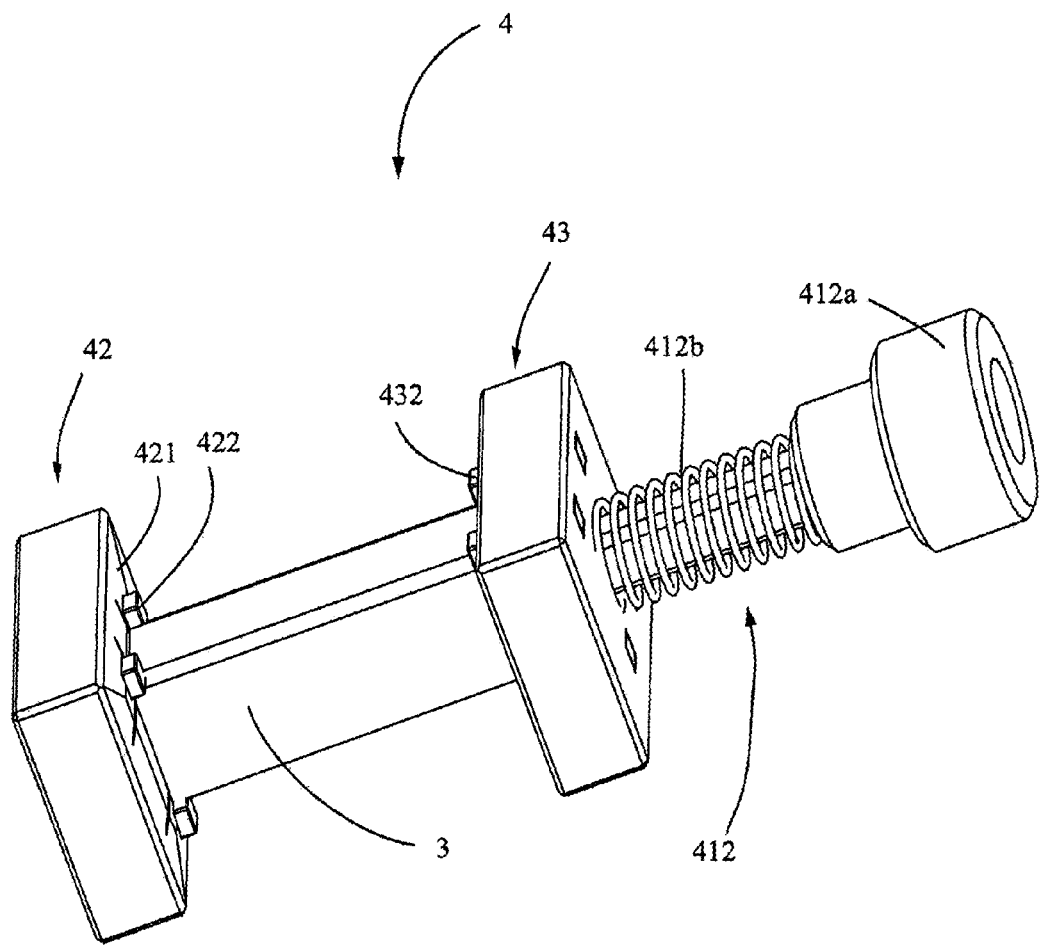
FIG. 4B is a schematic view of the fabricating apparatus shown in FIG. 2A with a light tunnel being loaded thereon.

In references to both FIGS. 4A and 4B together, the fabricating apparatus 4 in this embodiment comprises a core rod 41, a fixing block 42 and a moving block 43. The core rod 41 has an inner axial portion 411 and an adjustment portion 412. The inner axial portion 411 has a first length 413, and the adjustment portion 412 can be adjusted to change the first length 413 of the inner axial portion 411 so that the first length 413 is equal to the axial length 33 of the light tunnel 3. In this embodiment, the core rod 41 is made of a stainless steel.

The fixing block 42 is disposed at one end of the axial portion 411, and has a first surface 421 and two first bumps 422 disposed on the first surface 421. The first bumps 422 abut against the reflecting sheets 30 of the light tunnel 3 to define the first inner profile 311.

The moving block 43 is disposed between the inner axial portion 411 and the adjustment portion 412 of the core rod 41, and has a second surface 431 and two second bumps 432 disposed on the second surface 431. The second bumps 432 abut against the reflecting sheets 30 of the light tunnel 3 to define the second inner profile 321. Additionally, the second surface 431 is opposite to the first surface 421.

The adjustment portion 412 of the core rod 41 comprises a knob 412a and a first elastic device 412b. In this embodiment, a spring is used as the first elastic device 412b. One end of the first elastic device 412b abuts against the knob 412a, and the other end thereof abuts against the moving block 43. The knob 412a and the first elastic device 412b exert an axial force on the inner axial portion 411 to adjust and fix the position of the moving block 43 so that the first length 413 is equal to the axial length 33 of the light tunnel 3. It shall be appreciated that the first elastic device is not limited to be a spring, but may also be some other elastic element depending on the practical needs.

More specifically, the knob 412a may be turned to compress or release the first elastic device 412b. When the first elastic device 412b is released, the moving block 43 is forced to move away from the fixing block 42 to increase the first length 413 of the inner axial portion 411; and conversely, when the first elastic device 412b is compressed, the moving block 43 moves towards the fixing block 42 to shorten the first length 413. In this way, the adjustment portion 412 can be moved back and forth to change the first length 413 of the inner axial portion 411.

One end of the reflecting sheets 30 of the light tunnel 3 closely leans on the first bumps 422 of the first surface 421, and the other end thereof closely leans on the second bumps 432 of the second surface 431. The first bumps 422 and the second bumps 432 are designed and produced according to the inner dimensions of the light tunnel 3 so that the inner surfaces of the light tunnel 3 directly lean on both the first bumps 422 and the second bumps 432 to accurately control the inner dimensions of the light tunnel 3.

When a light tunnel is to be fabricated, the fabricating apparatus 4 and the support platform 6 of the assembling apparatus 2 are used at the same time. In references to both FIGS. 2A and 2B, the fabricating apparatus 4 is fixed on the support platform 6. The support platform 6 comprises a base plate 61, a first leaning post 62, a second leaning post 63 and four second elastic devices 64. The base plate 61 has a bottom surface 611. The first leaning post 62 is disposed at one end of the bottom surface 611 and abuts against the fixing block 42 of the fabricating apparatus 4. The second leaning post 63 has a control shaft 631 and is disposed at the other end of the bottom surface 611. The control shaft 631 of the second leaning post 63 abuts against the adjustment portion 412 of the fabricating apparatus 4 to adjust the first length 413 of the inner axial portion 411 (i.e., the axial length 33 of the light tunnel 3).

The second elastic devices 64 are disposed on the first leaning post 62 to exert a normal force to the reflecting sheets 30 of the light tunnel 3 respectively so that the reflecting sheets 30 are fixed. Then, glue is applied to adhere the reflecting sheets 30 to each other so that they are fixedly connected together. In other embodiments, the second elastic devices 64 may also be disposed on the second leaning post 63. In this embodiment, each of the second elastic devices 64 is a flat spring; of course, other implementations of the second elastic devices 64 will also be readily appreciated by those skilled in the art.

According to the above descriptions, as compared to the conventional fabricating apparatus for a light tunnel, the fabricating apparatus of the present invention can accurately control and modulate the inner dimensions of the light tunnel through internal positioning so that the characteristics of the light tunnels can be controlled more easily to make the quality of the light tunnels more stable.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An assembling apparatus for a light tunnel, the light tunnel having a plurality of reflecting sheets, a first end portion and a second end portion, wherein the first end portion and the second end portion have a first inner profile and a second inner profile respectively, and the first end portion and the second end portion defines an axial length, the assembling apparatus comprising:
    a fabricating apparatus, comprising:
        a core rod, having an inner axial portion and an adjustment portion, the inner axial portion having a first length, and the adjustment portion having a first elastic device;
        a fixing block, being disposed at an end of the inner axial portion, the fixing block having a first surface and a plurality of first bumps disposed on the first surface, and the plurality of first bumps defining the first inner profile; and
        a moving block, being disposed between the inner axial portion and the adjustment portion, the moving block having a second surface and a plurality of second bumps disposed on the second surface, the plurality of second bumps defining the second inner profile, and the second surface being opposite to the first surface; and
    a support platform, having a plurality of second elastic devices, and the fabricating apparatus being fixed on the support platform,
    wherein the first elastic device of the fabricating apparatus is adapted to make the first length of the inner axial portion equal to the axial length of the light tunnel, and the plurality of second elastic devices of the support platform are adapted to exert a normal force to the plurality of reflecting sheets of the light tunnel.

2. The assembling apparatus as claimed in claim 1, wherein the plurality of reflecting sheets are glasses.

3. The assembling apparatus as claimed in claim 1, wherein the adjustment portion further comprises a knob, the knob and the first elastic device exert an axial force to the moving block to make the first length equal to the axial length.

4. The assembling apparatus as claimed in claim 1, wherein the first elastic device is a spring.

5. The assembling apparatus as claimed in claim 1, wherein the second elastic devices comprise at least one flat spring.

6. The assembling apparatus as claimed in claim 1, wherein the support platform comprises:
    a base plate, having a bottom surface;
    a first leaning post, being disposed at one end of the bottom surface and abutting against the fixing block; and
    a second leaning post, having a control shaft and being disposed at the other end of the bottom surface, the control shaft abutting against the adjustment portion to adjust the first length of the inner axial portion.

7. The assembling apparatus as claimed in claim 6, wherein the second elastic devices are disposed at one of the first leaning post and the second leaning post.

8. The assembling apparatus as claimed in claim 1, wherein the first inner profile is the same as the second inner profile.

9. The assembling apparatus as claimed in claim 1, wherein the first inner profile is smaller than the second inner profile.

10. The assembling apparatus as claimed in claim 1, wherein a material of the core rod is a stainless steel.

* * * * *